United States Patent [19]
Albanese et al.

[11] Patent Number: 5,617,541
[45] Date of Patent: Apr. 1, 1997

[54] SYSTEM FOR PACKETIZING DATA ENCODED CORRESPONDING TO PRIORITY LEVELS WHERE RECONSTRUCTED DATA CORRESPONDS TO FRACTIONALIZED PRIORITY LEVEL AND RECEIVED FRACTIONALIZED PACKETS

[75] Inventors: Andres Albanese; Michael G. Luby; Johannes F. Bloemer; Jeffrey A. Edmonds, all of Berkeley, Calif.

[73] Assignee: International Computer Science Institute, Berkeley, Calif.

[21] Appl. No.: 361,802

[22] Filed: Dec. 21, 1994

[51] Int. Cl.$^6$ ........................ G06F 3/00
[52] U.S. Cl. .............. 395/200.13; 395/182.03; 395/611; 369/940; 369/942.8; 369/943.9; 369/945; 371/324; 380/42
[58] Field of Search .............. 341/50; 364/240.8, 364/241, 960.61, 960.62, 941.6, 943.9; 371/30, 48, 37.4; 395/200.06, 700, 600, 182.03, 200.13; 380/42

[56] References Cited

U.S. PATENT DOCUMENTS

| | | | |
|---|---|---|---|
| 5,105,442 | 4/1992 | Wei | 375/39 |
| 5,164,963 | 11/1992 | Lawrence et al. | 375/39 |
| 5,289,501 | 2/1994 | Seshadri et al. | 375/17 |
| 5,377,051 | 12/1994 | Lane et al. | 360/33.1 |
| 5,440,584 | 8/1995 | Wiese | 375/242 |
| 5,481,312 | 1/1996 | Cash et al. | 348/466 |

OTHER PUBLICATIONS

Biersack, E.: "Performance Evaluation of Forward Error Correction in ATM Networks," IEEE Journal on Selected Areas in Communication, vol. 4, pp. 631–640, 1993 (reprint; pp. 1–10).

Cox, R.V., Hagenauer, J., Seshadri, N., and Sundberg, C.–E.: "Combined Source and Channel Coding Using a Sub-Band Coder," presented at ICASSP '88, pp. 1–4.

Hagenauer, J.: "Rate-Compatible Punctured Convolutional Codes (RCPC Codes) and their Applications," IEEE Transactions on Communications, vol. 36(4), pp. 389–400, 1988.

Hagenauer, J., Seshadri, N., Sundberg, C.–E.: "The Performance of Rate-Compatible Punctured Convolutional Codes for Future Digital Mobile Radio," in VTC '88, pp. 1–8, 1988.

(List continued on next page.)

*Primary Examiner*—Thomas C. Lee
*Assistant Examiner*—Anderson I. Chen
*Attorney, Agent, or Firm*—Gary S. Williams; Flehr, Hohbach, Test, Albritton & Herbert

[57] ABSTRACT

A data distribution system has a number of data processing devices interconnected by data transmission media. At least one of the data processing devices transmit data to other data processing devices in the system. The transmitting data processing system includes memory for storing the data to be transmitted, programmable data processing circuitry, and data transmission apparatus for transmitting an encoded representation of the stored message as a sequence of data packets. Priority data, stored in the memory, represents a plurality of assigned priority levels for specified portions of the stored message such that portions of the stored message have respective assigned priority levels. A data encoding program generates an encoded representation of the stored message that includes, for each portion of the stored message, a level of redundant data corresponding to the priority level assigned to that portion of the stored message. As a result, the encoded representation of the stored message includes different levels of redundant data for the different portions of the stored message. Each receiving data processing system includes memory for storing received data, programmable data processing circuitry, and data receiving apparatus for receiving at least a portion of the transmitted data packets. A data decoding program generates a decoded representation of the received data stream. The data decoding program decodes different portions of the received encoded data in accordance with the different levels of redundant data included in the received data stream.

19 Claims, 8 Drawing Sheets

OTHER PUBLICATIONS

Hagenauer, J., Seshadri, N., Sundberg, C.-E.: "Variable-Rate Sub-Band Speech Coding and Matched Channel Coding for Mobile Radio Channels," in VTC '88, pp. 1–8, 1988.

Hellerstein, L., Gibson, G.A., Karp, R., Katz, R., and Patterson, D.: "Coding Techniques for Handling Failures in Large Disk Arrays," Algorithmica, vol. 12, pp. 182–208, 1994.

Lamparter, B., BhÖrer, O., Effelsberg, W., and Turau, V.: "Adaptable Forward Error Correction for Multimedia Data Streams," Technical Report TR 93–009, Fakultä fü Mathematik and Informatik, Universität Manheim, pp. 1–16, 1993.

Masnick, B. and Wolf, J.: "On linear unequal error Protection codes," IEEE Trans. Inform. Theory, vol. IT-3(4), pp. 600–607, 1967.

McAuley, A.: "Reliable Broadband Communication Using a Burst Erasure Correcting Code," presented at ACM SIGCOMM '90, pp. 1–10, 1990.

Rabin, M.: "Efficient Dispersal of Information for Security, Load Balancing, and Fault Tolerance," Journal of the ACM, vol. 36(2), pp. 335–338, 1989.

Roman, S: Coding and Information Theory, Springer-Verlag, pp. 293–294, NEED DATE.

Shacham, N: "Multicast Routing of Hierarchical Data," ICC '92, IEEE, pp. 1217–1221, 1992.

Van Gils, W.J.: "Linear unequal error protection codes from shorter codes," IEEE Trans. Inform. Theory, vol. IT-30 (30), pp. 544–546, 1984.

Wicker, S. and Bhargava, V., eds.: Reed–Solomon Codes and their Applications, IEEE Press, p. 75. NEED DATE.

$$a_1(z) = D(0) + D(1) \cdot z + D(2) \cdot z^2 + \ldots + D(X_1-1) \cdot z^{X_1-1}$$
$$a_2(z) = D(X_1) + D(X_1+1) \cdot z \ldots + \ldots D(2X_1-1) \cdot z^{X_1-1}$$

| 0 | Encoded Mapping Info | $a_1(0)$ | $a_2(0)$ | | CRC | 170 |
|---|---|---|---|---|---|---|
| 1 | Encoded Mapping Info | $a_1(1)$ | $a_2(1)$ | | CRC | 170 |
| 2 | Encoded Mapping Info | $a_1(2)$ | $a_2(2)$ | | CRC | 170 |
| | | | | ⋮ | | |

FIGURE 6

Erasure Resilient Code

| | Encoded Mapping Info (174, 179) | Clear Text Data | Clear Text Data (134) | CRC (176) | |
|---|---|---|---|---|---|
| 0 | Encoded Mapping Info | Clear Text Data | Clear Text Data | CRC | 170 |
| 1 | Encoded Mapping Info | Clear Text Data | Clear Text Data | CRC | 170 |
| ⋮ | ⋮ | ⋮ | ⋮ | ⋮ | |
| | Encoded Mapping Info | Clear Text Data | Clear Text Data | CRC | 170 |
| | Encoded Mapping Info | Encoded Redundancy Data | Clear Text Data | CRC | |
| | Encoded Mapping Info | Encoded Redundancy Data | Encoded Rednd Data | CRC | |
| ⋮ | ⋮ | ⋮ | ⋮ | ⋮ | |
| | Encoded Mapping Info | Encoded Redundancy Data | Encoded Rednd Data | CRC | |

FIGURE 7

| FIGURE 9A |
|---|
| FIGURE 9B |

SYSTEM FOR PACKETIZING DATA ENCODED CORRESPONDING TO PRIORITY LEVELS WHERE RECONSTRUCTED DATA CORRESPONDS TO FRACTIONALIZED PRIORITY LEVEL AND RECEIVED FRACTIONALIZED PACKETS

The present invention relates generally to computer networks and other computer communications systems that transport data among network subscriber stations, and particularly to computer systems for encoding data so as to enable lossless reconstruction of received data even when a portion of the data has been lost or corrupted during transmission of the data to the recipient.

BACKGROUND OF THE INVENTION

Most computer based data transmission systems and data storage systems provide at least the ability to detect transmission and storage errors to prevent corrupted data from being accepted. Such error detection systems use "error detection" encoding techniques. The most commonly used error detection encoding technique makes use of error detection data called cyclic redundancy codes (CRCs), which are widely used due to their ease of computation and reliable error detection.

Erasure resilient codes, which enable lossless data recovery despite loss of information in transmission or storage, are also well known, although somewhat less widely used than error detection codes. For instance, Hamming codes and Reed-Solomon codes are two well known examples of erasure resilient codes. The corresponding data encoding techniques add redundant information to stored or transmitted data. Reed-Solomon codes are used in many magnetic disk storage systems.

In general, the amount of redundant data added to transmitted or stored data by such redundancy encoding techniques varies from system to system. Adding more redundant data allows lossless recovery of data with higher error or data loss rates than adding less redundant data, but reduces the transmission or storage efficiency of the associated system.

In real time data transmission systems, it is common to find that some parts of transmitted data are more important than other parts of the transmitted data. We will call a part consisting of equally important transmitted data a "unit". It is also common that units of different importance that are naturally related to each other are grouped together to constitute what we herein call a "message" or "logical message". Furthermore, it is quite common that the information in the less important units of a message are of no practical use without the information in the more important units, i.e., the less important units are critically dependent on the more important units.

In some previous systems known to the inventors of the present invention that use loss recovery encoding techniques, a single level of redundancy encoding is used for all data of each message transmitted or stored in each such system. For instance, known disk drive storage systems each use a single version of the Reed-Solomon encoding technique with a single level of data redundancy. Such systems are inefficient in terms of the total bandwidth required due to using the same level of importance for all units independent of their importance. Such systems tend to either (A) add less than the ideal amounts of redundancy to critical data due to the cost of adding such redundancy to the entire message, or (B) waste resources by adding redundancy to the entire message based on the level of redundancy needed for the most critical data.

All other prior systems known to the inventors have partitioned the data stream into units, and redundantly encoded each unit using a single level of redundancy according to its importance. Under some data loss conditions, such systems may suffer from the loss of the more important units within a message even when the less important dependent units get through.

It is an object of the present invention to allow the flexibility of using multilevel redundancy encoding over the entire message so as to guarantee acquisition of the units within the message in order of importance under any data loss conditions.

It is a primary object of the present invention to provide systems that efficiently add redundancy data to messages. It is a related object of the present invention to provide systems that encode different portions of a data stream with two or more different non-zero levels of redundant data such that portions of the data stream denoted as having higher priority are encoded with a higher level of redundant data than portions of the data stream denoted as having lower priority.

Another object of the present invention is to provide a system that accepts priority data regarding specified portions of a specified data stream and automatically scales the level of redundancy with which the various data stream portions are encoded in accordance with the priority data.

Another object of the present invention is to provide systems that automatically decode and recover received data encoded with multiple levels of redundant data.

Still another object of the present invention is to provide a hierarchical or priority level based data filtering subsystem for use in a data distribution system having one or more data distribution subsystems with insufficient available data bandwidth to transmit data streams that other portions of the data distribution system can handle. More specifically,, it is an objective of the present invention to provide a data filtering subsystem that automatically transmits only the highest priority portions of such data streams into low bandwidth portions of the data distribution system.

Another object of the present invention is to simplify network communication protocols by making application programs responsible for redundant data encoding and decoding, while the network level software handles only data transmission on corrupted data detection through the use of standard CRC codes or the like.

SUMMARY OF THE INVENTION

In summary, the present invention is a data distribution system having a multiplicity of data processing devices interconnected by data transmission media. At least one of the data processing devices transmits data to a plurality of the other data processing devices in the system.

The transmitting data processing system includes memory for storing data (sometimes called messages) to be transmitted, programmable data processing circuitry, and data transmission apparatus for transmitting an encoded representation of the stored data as an encoded data stream. Priority data, stored in the memory, represents a plurality of assigned priority levels for specified portions of the stored data such that all portions of the stored data have respective assigned priority levels. A data encoding program, executed by the programmable data processing circuitry, generates an encoded representation of the stored data that includes, for each portion of the stored data, a level of redundant data corresponding to the priority level assigned to that portion of the stored data. As a result, the encoded representation of the stored data includes a plurality of different levels of redundant data for the different portions of the stored data.

Each receiving data processing system includes memory for storing received data, programmable data processing circuitry, and data receiving apparatus for receiving at least a subset of the encoded data stream. A data decoding program, executed by the programmable data processing apparatus, generates a decoded representation of the received data stream. The data decoding program decodes different portions of the received encoded data in accordance with the different levels of redundant data included in the received data stream.

In a preferred embodiment application programs, rather than network control software, determine the priority levels of the various portions of the data to be transmitted. The application programs call data encoding procedures so as to encode data with erasure resilient codes at redundancy levels associated with the priority levels assigned to the data portions by the application programs. The encoded representation of the data is called an erasure resilient code. By making application programs responsible for data redundancy encoding and decoding, network protocols and systems are simplified.

The data encoding procedures embed data representing the priority data in the transmitted data stream. The data decoding program in the receiving data processing systems recovers the priority data from the received data stream and stores the recovered priority data in its memory.

In some preferred embodiments, the data encoding program in the transmitting data processing system reorders, within a single message, portions of the encoded representation of the message in accordance with the priority data. The receiving data processing systems re-map the received data back into the data's original order.

One reason for reordering the transmitted data is to facilitate truncation of the transmitted data by a data filter in a hierarchical data transmission system. The data filter receives the transmitted encoded data stream prior to its receipt by the receiving data processing devices, removes portions of the received encoded data stream corresponding to the portions of the data assigned the lowest priority level(s) so as to generate a reduced bandwidth data stream, and then transmits the reduced bandwidth data stream to the receiving data processing devices.

Different embodiments of the present invention use different erasure resilient codes for encoding the data to be transmitted. Some erasure resilient codes, such as Reed Solomon codes and the XOR based erasure resilient code in one of the preferred embodiments, include (A) the data or message to be transmitted in uncoded or "clear text" form, and (B) encoded redundant data. This has the advantage that when all the transmitted data is received, virtually no computational resources are required to recover the original data. The only computation resources used in those circumstances are the computational resources required to verify error free receipt of the data and to filter out the encoded redundant data. When a portion of the transmitted data is not received, the data decoding program decodes the encoded redundant data portion of the received data to generate those portions of the data in the transmitted data stream not received.

In other preferred embodiments, the erasure resilient code used to transmit the data in a message consists entirely of data in an encoded representation.

BRIEF DESCRIPTION OF THE DRAWINGS

Additional objects and features of the invention will be more readily apparent from the following detailed description and appended claims when taken in conjunction with the drawings, in which:

FIG. 6 is a block diagram of the data packets shown in FIG. 4 in accordance with a first preferred embodiment of the present invention.

FIG. 7 is a block diagram of the data packets shown in FIG. 4 in accordance with a second preferred embodiment of the present invention.

DESCRIPTION OF THE PREFERRED EMBODIMENTS

Figure 1:
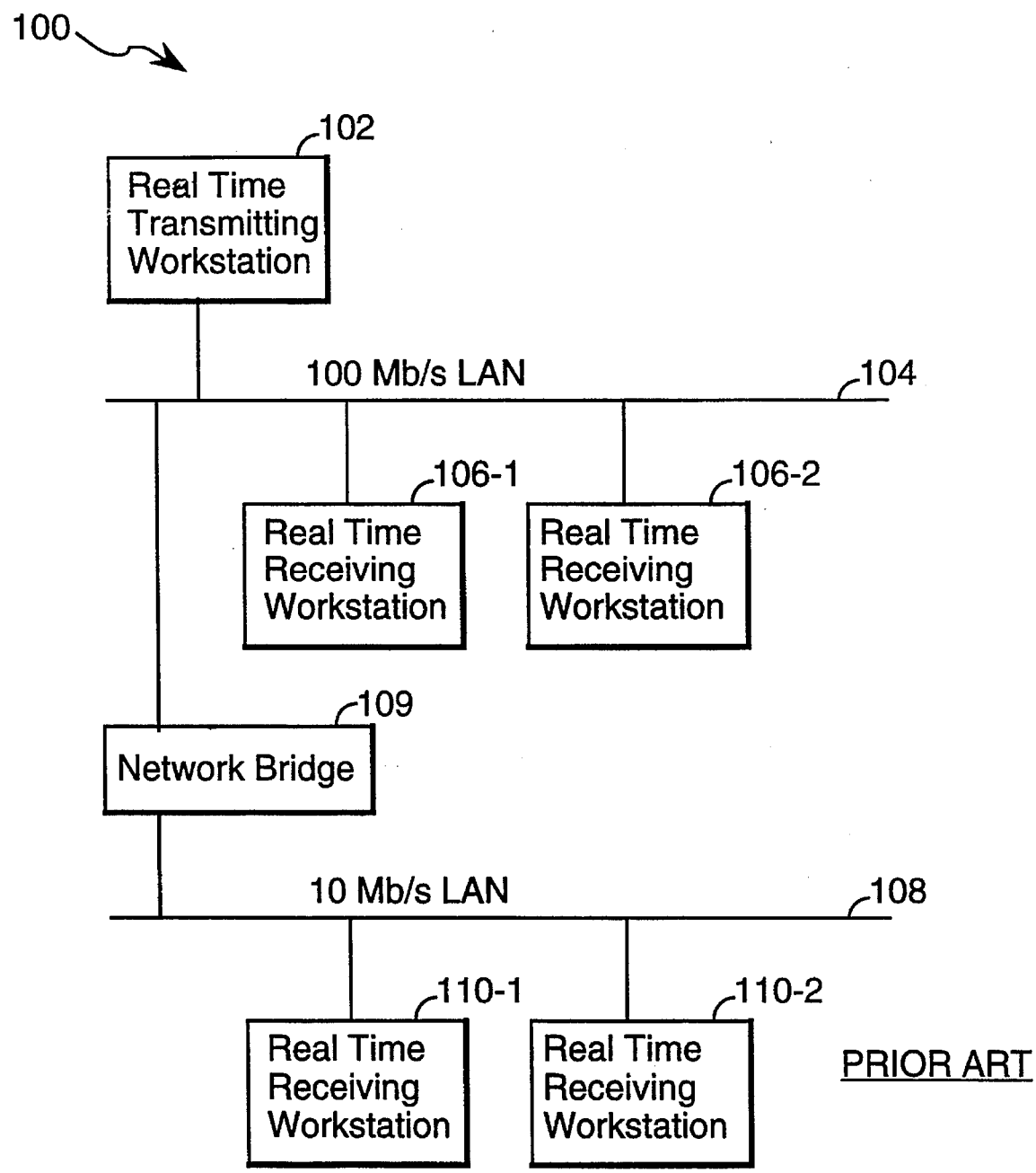
FIG. 1 is a block diagram of a data distribution system for transmitting real time data, such as a video program, from transmitting workstations to receiving workstations.

Referring to FIG. 1, there is shown a data distribution system 100 having a multiplicity of data processing devices 102, 106, 110 interconnected by data transmission media 104, 108. At least one of the data processing devices 102 transmits data to a plurality of the other data processing devices 106, 110 in the system.

For convenience, the data processing devices 102, 106, 110 are herein sometimes called workstations, subscriber stations or subscriber workstations. These terms are interchangeable.

For instance, the data distribution system 100 could be a wide area computer network that incorporates a number of local area networks. Such local area networks can be interconnected via one or more "network bridges" 109. For the purposes of explaining the present invention, it will be assumed that the transmitting data processing system 102 is transmitting real time video images in the MPEG2 data format to subscriber stations 106, 110 having two distinct data bandwidth receiving capabilities.

For instance, the subscriber stations 106 might be set top receivers for high definition televisions, while subscriber stations 110 might be set top receivers for standard televisions. In such a system, network bridge 109 would filter out portions of the high definition television data stream that are unusable by the set top converters 110 for standard televisions. When high and low bandwidth devices are intermixed, but all connected to a high bandwidth transmission medium, similar filtering can be performed at those of the subscriber stations 106, 110 that cannot process a portion of the transmitted information, by simply not processing those portions of the received data stream. Furthermore, the transmitting station 102 may also perform a data filtering function, by transmitting out only the most important information when its outgoing data link is congested.

In another embodiment, subscriber stations 106, 110 are computer work stations that, among other tasks, can receive real time video transmissions. While workstations 106 have a high bandwidth connection to workstation 102 while workstations 110 have a lower bandwidth connection to workstation 102.

Figure 2:
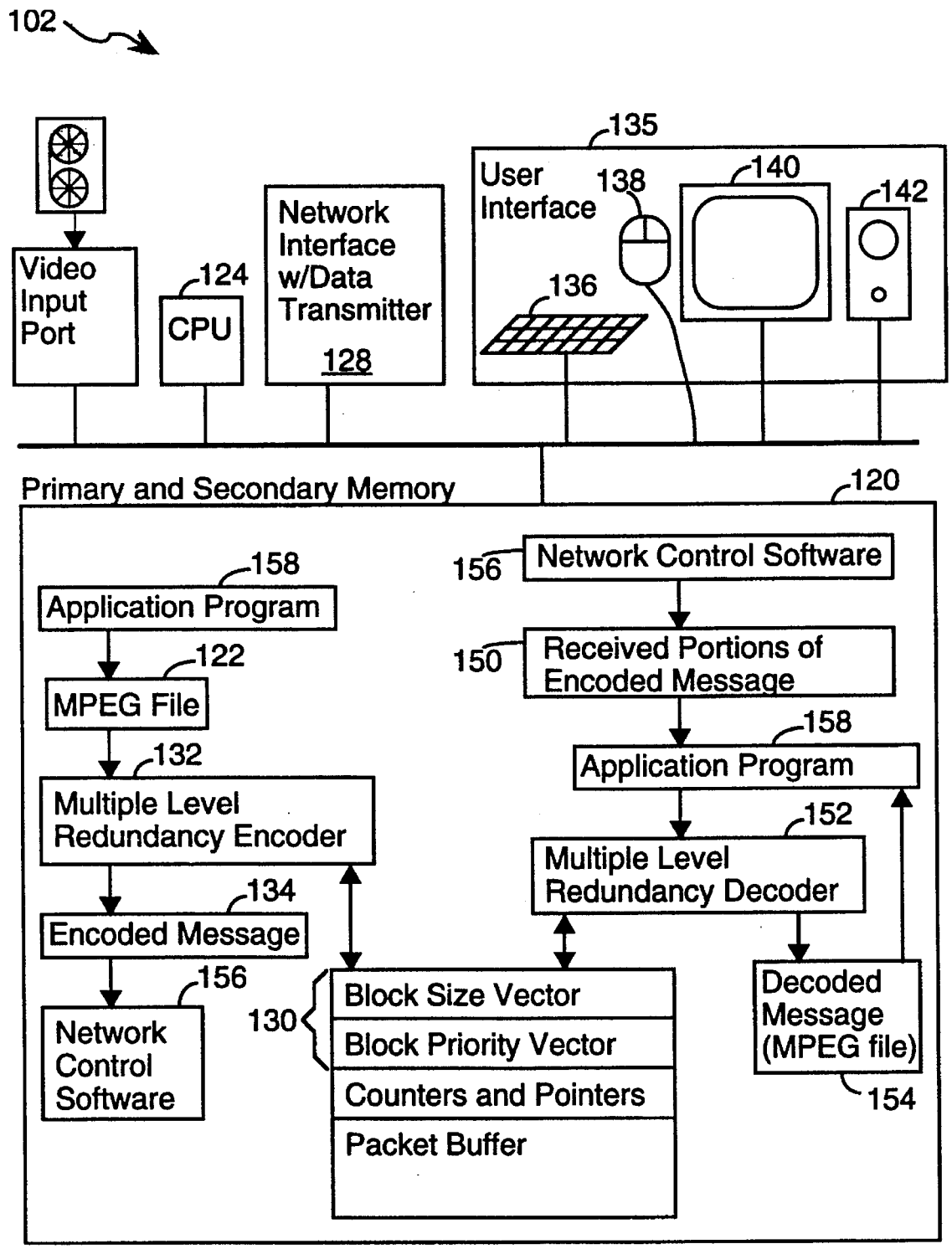
FIG. 2 is a block diagram of a data transmitting workstation in accordance with the present invention.

Referring to FIG. 2, the transmitting data processing system 102 is typically a desk top workstation computer (or a set top signal converter for a television) that includes memory 120 for storing data 122 to be transmitted, programmable data processing circuitry (CPU) 124, and data transmission apparatus 128 (e.g., a network interface card) for transmitting an encoded representation of the stored data as an encoded data stream. For convenience, the stored data 122 will sometimes herein be called the "message" that is to be transmitted.

Priority data 130, stored in the memory 120, represents a plurality of assigned priority levels for specified portions of the message 122 such that all portions of the message have respective assigned priority levels. A data encoding program 132, executed by the programmable data processing circuitry 124, generates an encoded message 134 representation of the message 122 that includes, for each portion of the message, a level of redundant data corresponding to the priority level assigned to that portion of the message. As a result, the encoded representation 134 of the stored message 122 includes a plurality of different non-zero levels of redundant data for the different portions of the stored message 122.

The transmitting data processing system 102 preferably includes a user interface 135 having a keyboard 136, pointing device 138, display device 140 and audio speaker 142.

The transmitting data processing system 102 will preferably include apparatus for receiving and decoding messages sent by other network subscribers. The data receiver will typically be the same network interface 128 used for transmitting encoded data. Received encoded messages 150 are processed by a decoder program 152, described in more detail below, to produce a decoded message file 154.

In the preferred embodiment, when the network subscriber 102 is a computer workstation, network control software 156 handles the transmission and receipt of data packets via the network interface 128, including adding a CRC error detection value to each data packet to be transmitted and checking the CRC values on received data packets. When a received data packet's CRC value does not match the CRC value computed by the network control software 156 for the received data packet, the received data packet is discarded because its contents have been corrupted.

Application programs 158 generate or otherwise provide the data to be transmitted by the network, and are also responsible for processing received data packets once the data packets have been validated via the above mentioned CRC check. In the preferred embodiment, unlike prior art systems utilizing erasure resilient codes, application programs 158 are responsible for the encoding and decoding of the erasure resilient codes instead of the network control software 156. Primary reasons for making application programs responsible for erasure resilient encoding and decoding are A) the information needed to determine redundancy priority levels for the various different portions of the transmitted data is typically resident in the application programs, and B) simplification of the network control software makes the transmission network more efficient and manageable.

Figure 3:
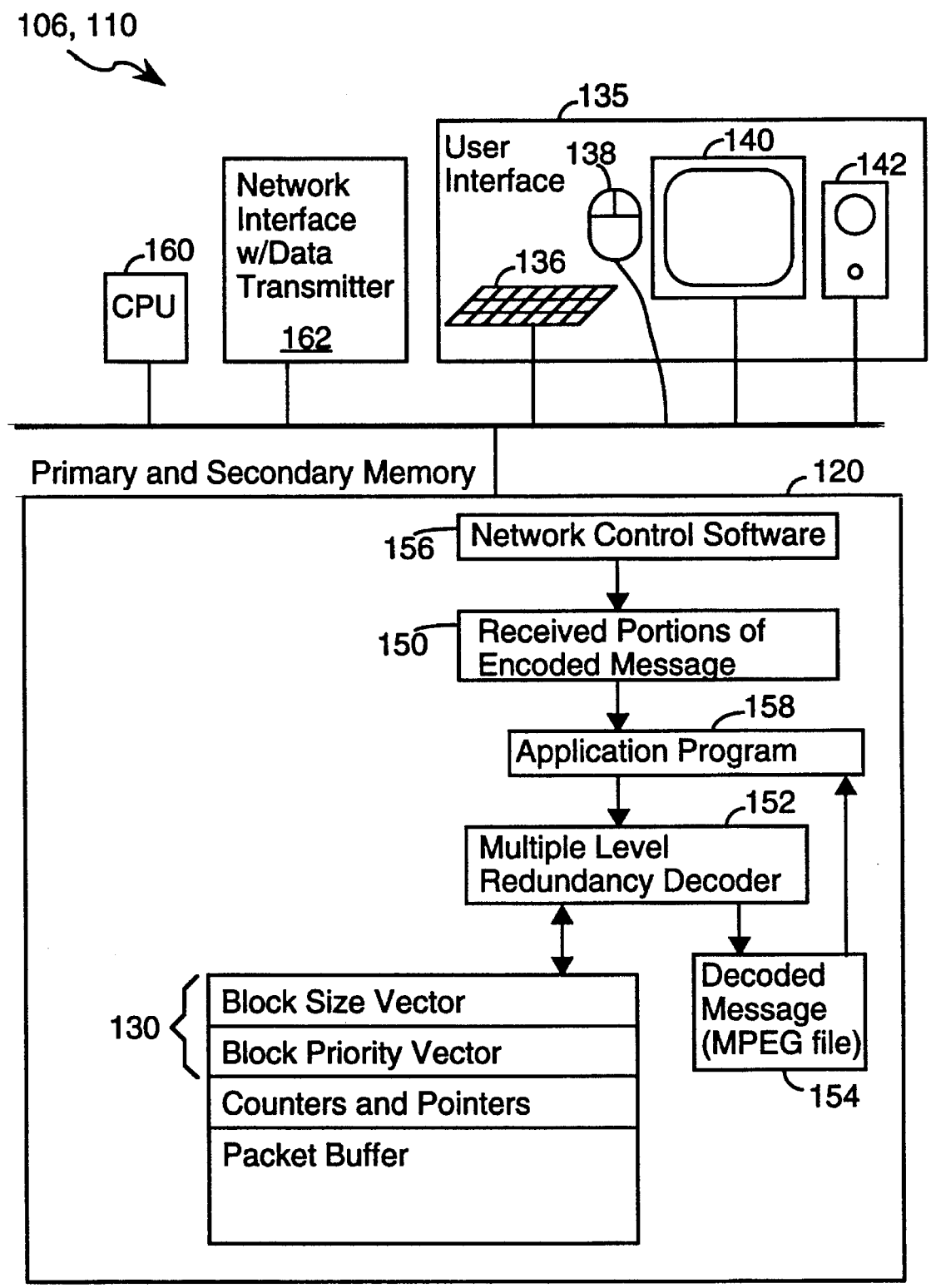
FIG. 3 is a block diagram of a data receiving workstation in accordance with the present invention.

Referring to FIG. 3, in the preferred embodiment the receiving data processing systems 106, 110 are also typically desk top workstation computers or personal computers that include memory 120 for storing received encoded messages 150, programmable data processing circuitry CPU) 160, and data receiving apparatus 162 (e.g., a network interface card or satellite receiving disk) for transmitting an encoded representation of the stored data as an encoded data stream. As mentioned above, the receiving data processing systems 106, 110 may also be set top receivers for televisions or other similar devices.

Network control software 156 initially processes received data packets by comparing the CRC value in each received data packets with a CRC value computed for the data packet by the network control software, and discarding data packets whose embedded and computed CRC values do not match. The received portions of the message that pass the CRC test are then passed to an application 158, which in turn calls a data decoding program 152.

The data decoding program 152, executed by the programmable data processing circuitry 160, generates a decoded message 154. The data decoding program 152 decodes different portions of the received encoded data in accordance with the different levels of redundant data included in the received data stream.

When the receiving data processing system 106 are television "set top" receivers, the receiving data processing system 106 will typically have no user interface 135 other than a television set or other display and audio output device and a remote controller or the like for inputting user commands. In such embodiments the keyboard 136 and pointing device 138 will typically be replaced by a remote control device and an infrared signal receiver.

Figure 4:
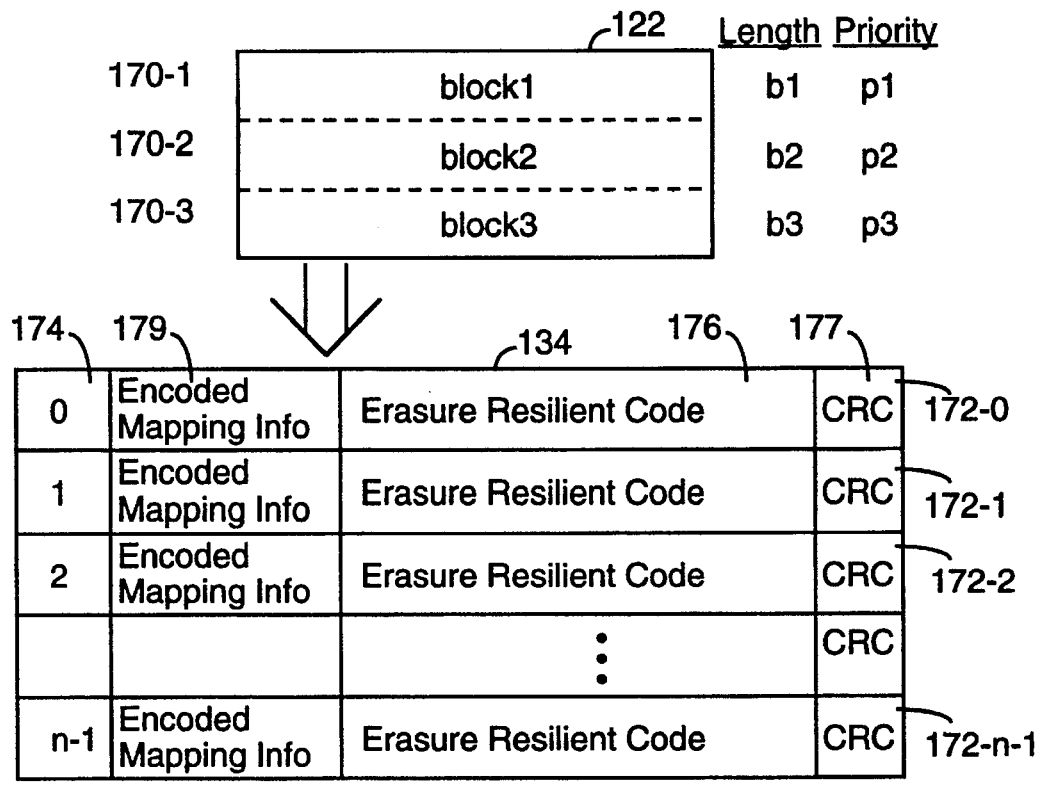
FIG. 4 is a block diagram of data structures for storing a message and for storing data packets containing an encoded representation of the message.

Referring to FIG. 4, for purposes of explaining the operation of the present invention, we will assume that the data 122 to be transmitted is divided into three blocks 170-1, 170-2 and 170-3 of data, having respective lengths of b1, b2 and b3. For instance, if the message is the MPEG data for a certain period of time, the message would include I-frames, P-frames and B-frames, each of which would be treated as a separate data block.

The three blocks 170 have separately assigned fractional priority values p1, p2, p3. For an MPEG message, suitable fractional priorities might be 0.5, 0.75 and 0.9 for I-frames. P-frames and B-frames, respectively. A "fractional priority value" is defined as follows: the data is to be encoded with redundant data such that if at least a p1 fraction of the transmitted data is received, then the data in the first block 170-1 will be recovered. For instance, if p1 were equal to 0.5, then the data would be encoded so that only half the transmitted data would need to be received to be able to recover the data in data block 170-1.

Note that a low fractional priority value is indicative of important data having a high priority level, while a high fractional priority value is indicative of less important data having a lower priority level. For convenience, this document will sometimes refer to "high priority levels" and "low priority levels," meaning relatively low and relatively high fractional priority levels, respectively.

It is a feature of the present invention that transmitted data can be divided into an unrestricted number of distinct blocks, and that each such block can have a distinct assigned priority level. Three blocks and three priority levels are used herein only to simplify the explanation of the invention.

The encoded data 134 consists, in one preferred embodiment, of a number of data packets 172-0, 172-1, . . . , 172-n-1. Each packet 172 includes, at a minimum, a packet ID 174, a portion of the erasure resilient code 176 (which may include uncoded clear text data) for the message, and a packet CRC code 177. In the preferred embodiments all or some of the transmitted data packets 170 also include "mapping information" 178.

As indicated above, a logical message is transmitted as a set of data packets, and it is quite possible for the data packets for a single message to be transmitted to a subscriber over multiple transmission routes. In other words, some data packets within a message may take a longer or different transmission path than other packets. As a result, the data packets may arrive at a subscriber station in a different order than the order in which they were transmitted. The packet ID 174 embedded in each transmitted data packet allows the receiving subscriber stations to reassemble the received data packets in their proper order, regardless of the order in which they are received.

Figure 5A:
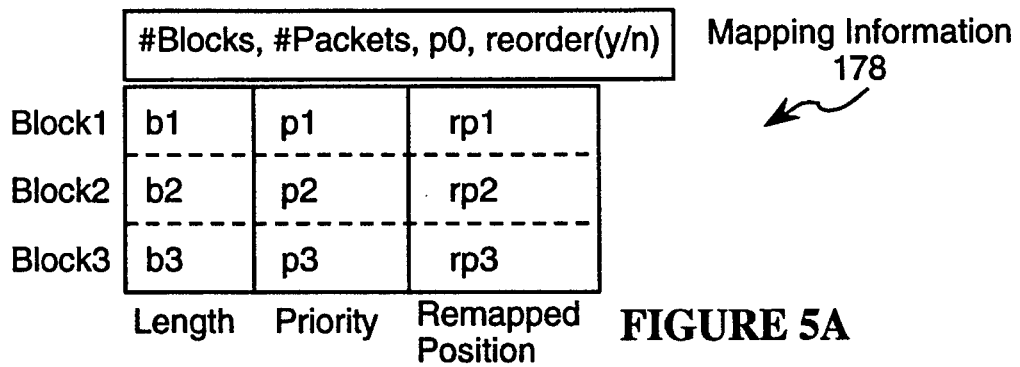
FIG. 5A is a block diagram of mapping information embedded in the data packets of FIG. 4.

Referring to FIG. 5A, in some preferred embodiments the Mapping Information 178 contains data that enables the receiving devices to determine block lengths b1 to b3, the fractional priority values p1 to p3 associated with the transmitted data, and remapped position data rp1 to rp3.

It is sometimes desirable to order the data within the encoded data packets 134 in a different order from that of the original data 122. One reason for reordering the transmitted data is to facilitate truncation of the transmitted data by a data filter. The data filter receives the transmitted encoded data steam prior to its receipt by the receiving data processing devices, removes portions of the received encoded data stream corresponding to the portions of the data assigned the lowest priority level(s) so as to generate a reduced bandwidth data stream, and then transmits the reduced bandwidth data stream to the receiving data processing devices.

For instance, data filtering based on priority levels may be required when the transmitted data is sent to receiving devices or media with limited data bandwidth. More specifically, lower priority data might be deleted from the transmitted encoded data by a network bridge 109 (see FIG. 1) if the bandwidth of the receiving local area network is insufficient to handle the full bandwidth of the transmitted data. In such a system, it will sometimes be preferable to order the data within the transmitted data to simplify the data truncation task of the network bridge 109.

The remapped position data rp1, rp2, rp3 indicates the relative position of each of the source data blocks 170-1, 170-2, 170-3 located within the encoded data 134.

In some preferred embodiments of the present invention, only one type of data (e.g., MPEG2 data) is transmitted, and priority values are permanently assigned to that one type of data. In such embodiments, the mapping information 178 that is embedded in the transmitted data packets needs to include only block size information. In other embodiments the priority values are updated occasionally, but not with every data transmission.

When data packets within a data stream are truncated so as to filter out a portion of the data stream, the CRC values of those packets will typically require recomputation. Alternately, "partial packet CRC" values can be pre-computed by the transmitting workstation 102 and inserted in the original data packets at the point the packets will be truncated by downstream filters so as to avoid the need for the data stream filtering devices to compute new CRC values.

Figure 5B:
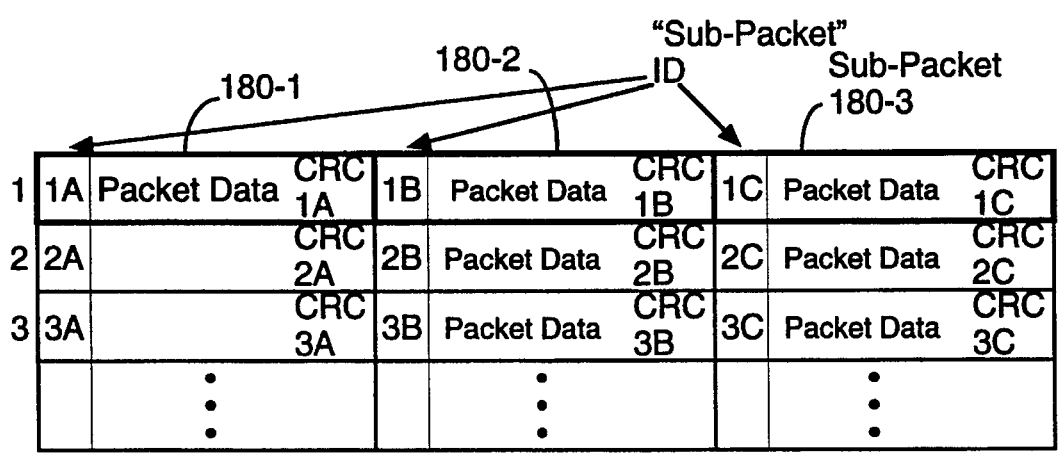
FIG. 5B is a block diagram showing how data packets can be prepared by a transmitting station for truncation by downstream data filters.

Referring to FIG. 5B, yet another alternative way to handle the need for accurate CRC values in truncated data packets is to break each data packet 172 into two or more "sub-packets" 180, each having its own "sub-packet ID" and its own CRC. In the example shown in FIG. 5B, each data packet is divided into three sub-packets 180-1, 180-2 and 180-3, which may be transmitted by the communication network either together as a group, or as separate data packets. If the subpackets are transmitted separately, this results in the transmission of more data packets, but reassembly of the sub-packets into their proper order at the receiving subscriber stations is easy. On the other hand, transmission of the sub-packets together as a single data packet is useful in that it simplifies the data truncation task of data stream filters without requiring sub-packet reassembly by the receiving subscriber stations.

Referring to FIG. 6, in some preferred embodiments all the data in the encoded representation of the stored data is in encoded form. In other words, the erasure resilient code 134 portion of the transmitted data packets 170 does not include any "clear text data" suitable for use by the recipients without decoding.

Referring to FIG. 7, in other preferred embodiments the encoded representation of the stored data generated by the encoding program includes (A) the stored data in decoded form, and (B) encoded redundant data. This has the advantage that when all the transmitted data is received, virtually no computational resources are required to recover the original data. The only computation resources used in those circumstances are the computational resources required to verify error free receipt of the data and to filter out the encoded redundant data. When a portion of the transmitted data is not received, the data decoding program decodes the encoded redundant data portion of the received data to generate those portions of the data in the transmitted data stream not received.

Figure 8:
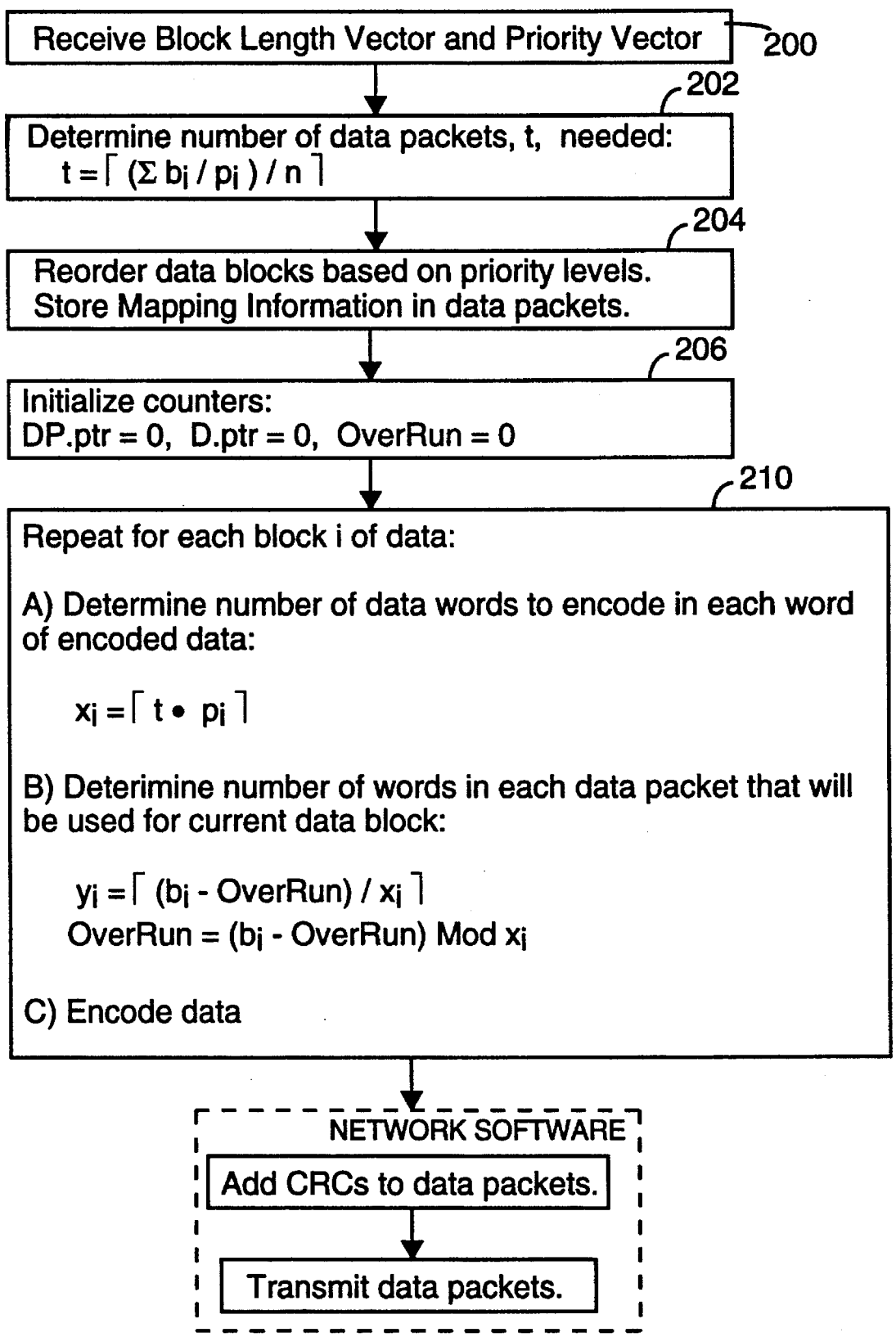
FIG. 8 depicts a flow chart of the data encoding procedure used in the first preferred embodiment of the present invention.

FIG. 8 shows a flow chart of a first preferred multiple level redundancy encoding procedure 132. The procedure receives a vector representing the block lengths of the data to be encoded and a vector of fractional priority values (step 200). Then it determines the total number t of data packets needed to store and transmit the data (step 202). This is determined by dividing each block length $b_i$ by its fractional priority $p_i$, to determine the length of the data block after it has been encoded ($b_i/p_i$). The computed encoded block lengths are then summed, and the resulting value is divided by n, which represents the space (i.e., the number of words) available in each data packet to store encoded message data.

$$t = \lceil (\Sigma b_i/p_i)/n \rceil$$

Next, at step 204, the data blocks are optionally reordered so that the data blocks having highest priority are processed first and positioned first within the data packets 170. While this is not necessary, some details of the main data encoding step (210) would require modification if the data blocks are not in "highest to lowest" priority order. In addition, the mapping information 178 is encoded to form encoding mapping information 179 and then stored in the data packets at step 204. In the preferred embodiment, the mapping information 178 is encoded using the same level of redundancy encoding as that used for the highest priority data block in the message. In addition, the encoded mapping information 179 in every data packet includes, in decoded form, one or more words that indicate (A) the total length of the encoded mapping information, (B) the number of data packets used to transmit the message, and (C) the fractional priority level p0 used to encode the mapping information. From those pieces of information and from a sufficient number of received packets the mapping information 178 can be decoded and determined by receiving stations.

At step 206 some loop counters and pointers are initialized. Step 210 is the main data encoding step, and is repeated for each data block in the message to be sent.

First, the procedure determines the number of data words $x_i$ in the current data block must be used to generate each word of the encoded message. The value of $x_i$ is based on the fractional priority of the data block:

$$x_i = \lceil t \cdot p_i \rceil$$

where t is an integer representing the number of data packets, $p_i$ is the fractional priority of the data block, the symbol "$\lceil z \rceil$" means "round z up the closest integer," and $x_i$ is an integer. Note that the preferred embodiment "overruns" the boundaries between data blocks during the encoding process when the amount of data in a data block is not an even multiple of $x_i$. Since the highest priority data blocks are encoded before lower priority data blocks, all message data in the "overruns" is encoded with a redundancy level equal to or higher than the redundancy level assigned to that data.

Next, the number of words $y_i$ within each data packet to be used for the current data block is determined:

$$y_i = \lceil (b_i - \text{OverRun})/x_i \rceil$$

where "OverRun" is the number of data words from the current data block that were included in the encoding of the prior data block, if any.

Then the OverRun value is updated for use when encoding the next data block:

$$\text{OverRun} = (b_i - \text{OverRun}) \bmod x_i$$

Finally, the data encoding process itself is performed. During the encoding process a first pointer D.ptr keeps track of a position in the source data (i.e., the message 122) and another pointer DP.ptr keeps track of a position in the data packets holding the encoded data.

For each $x_i$ words of the current message block, one word is generated in each of the t data packets:

k=D.ptr=function of data packet position m

DataPacket(z,m)=$D(k)+D(k+1)z+D(k+2)z^2+\ldots+D(k+x_i-1)z^{x_1-1}$ where z identifies the data packet and m identifies the word in the data packet in which the computed value is stored, and k through $k+x_1-1$ identify the source data words being encoded.

The above computation is repeated until all the words in the current data block, plus "OverRun" words of the next data block (if any), are encoded. Then the next data block, if any, is processed.

Figure 9A:
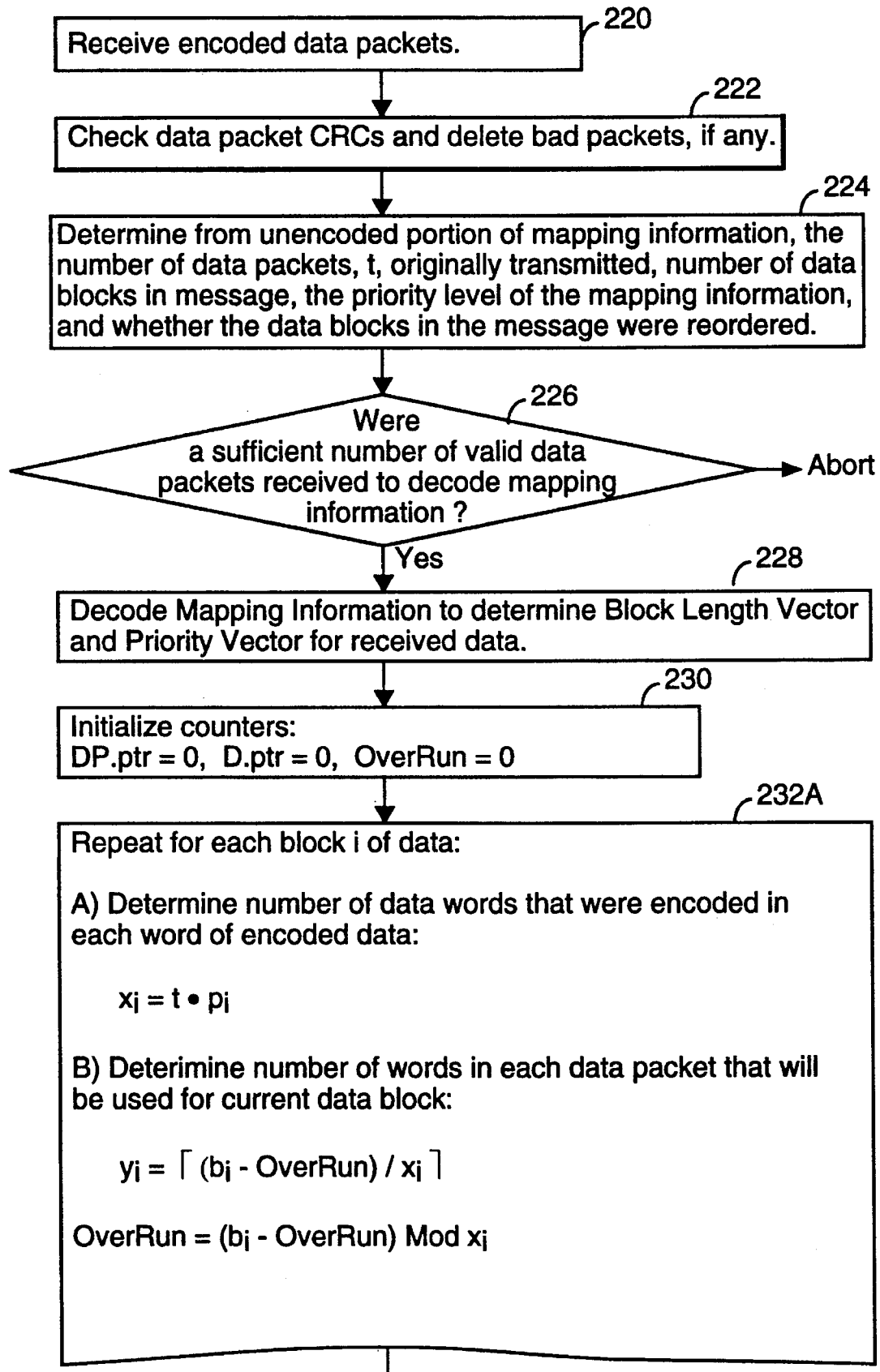
FIG. 9 depicts a flow chart of the data decoding procedure used in the first preferred embodiment of the present invention.
Figures 9, 9B:
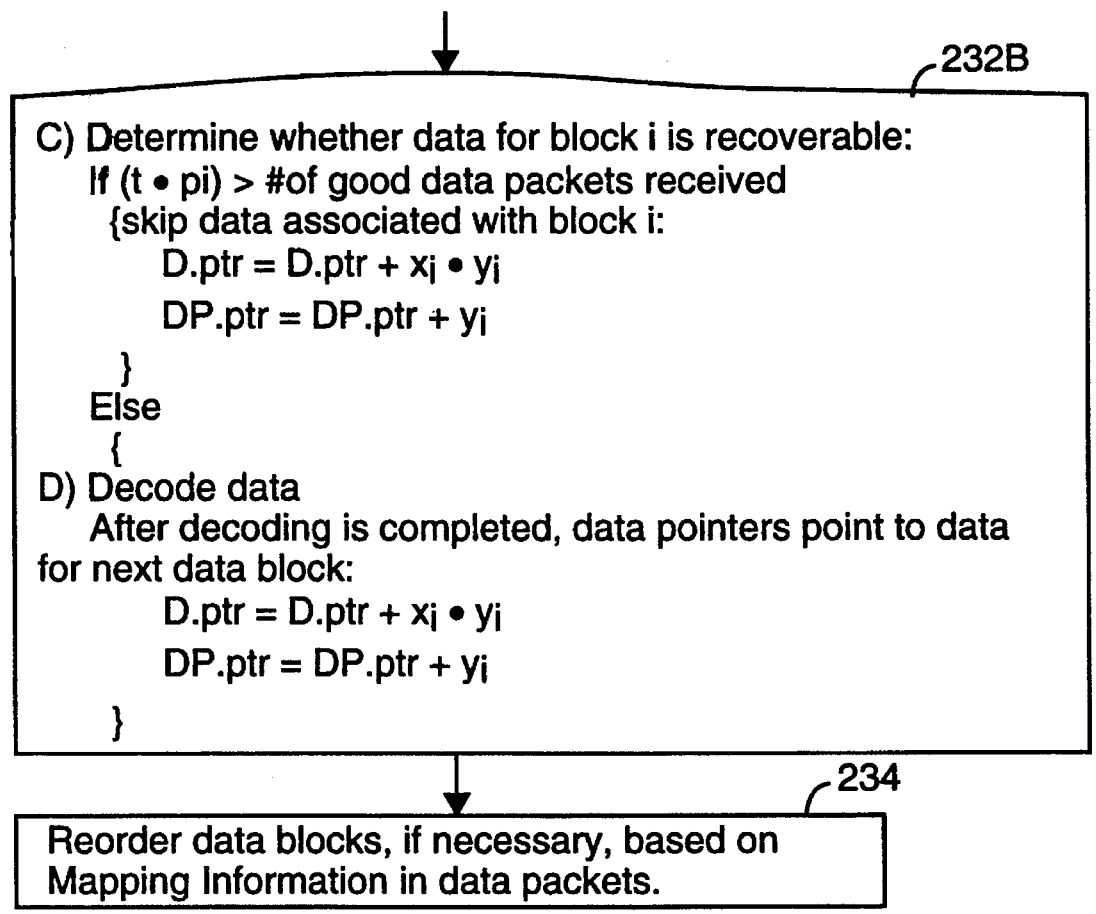

FIG. 9 is a flow chart of the multiple level redundancy decoder procedure used by receiving subscriber stations to decode the data packets that were encoded using the encoding procedure shown in FIG. 8.

First, the network control software will receive data packets (220), checks the packet CRCs and deletes any packets with invalid CRCs (222). The decoder procedure, which is preferably performed under the control of an application program rather than the network control software (in subscriber workstations that make such a distinction) may use either a "supply based" or "demand based" for determining when to start the process of decoding the received data packets. In a "supply based" system the decoder procedure the does as much decoding as possible as packets arrive. Thus, when packets arrive that contain cleartext parts of message blocks, it moves the cleartext to the appropriate parts of the reassembly blocks, and as soon as enough packets have arrived to reassemble an entire message block the decoder procedure immediately performs that task. In a "demand based" system, the decoder procedure is initiated whenever the controlling application needs more decoded data. In a real time video system, the application program might request new decoded data at a fixed frame update rate, for example by requesting a new frame of data at the same time that it start refreshing a display screen with the current frame of data.

At step 224, the uncoded portion of the mapping information is used to determine the number of data packets transmitted, the number of data blocks in the message, the priority level of the mapping information, and whether or not the data blocks in the message have been reordered.

If the number of valid received data packets is insufficient to decode the mapping information (step 226), the process of decoding the data packets is aborted (step 226). Otherwise, the mapping information in the received data packets is decoded to determine the block lengths and fractional priority values of the message (step 228).

At step 230 loop counters and pointers are initialized. Step 232 is the main data decoding step, and is repeated for each data block in the received encoded message.

First, the procedure determines for the current data block the number of data words $x_i$ that were encoded in each word of the received data packets. The value of $x_i$ is based on the fractional priority of the data block:

$$x_i = \lceil t \cdot p_i \rceil$$

Next, the number of words $y_i$ within each data packet that were used for the current data block is determined:

$$y_i = \lceil (b_i - \text{OverRun})/x_i \rceil$$

where "OverRun" is the number of data words from the current data block that were included in the encoding of the prior data block, if any.

Then the OverRun value is updated for use when encoding the next data block:

$$\text{OverRun} = (b_i - \text{OverRun}) \bmod x_i$$

Finally, the data decoding process itself is performed at step 232. For each data block, an initial determination is made as to whether a sufficient number of valid data packets were received to decode this data block. If the number of valid data blocks is insufficient to decode the current data block, and the data blocks are positioned in descending priority order within the received message, the remainder of the message is unrecoverable and the decoding process terminates. Assuming that there is a sufficient number of valid data packets to decode the current data block, the data block is decoded as follows.

During the decoding process a first pointer D.ptr keeps track of a position in the decoded data and another pointer DP.ptr keeps track of a position in the data packets holding the encoded data.

To recover each set of $x_i$ words in the transmitted message, one word in each of $y_i$ packets is decoded using an inverse matrix equation:

$$[D(k), D(k+1), \ldots, D(k+x_1-1)] = [DP(P_0, m), DP(P_1, m), \ldots, DP(P_{x_i-1}, m)]E$$

where k is equal to D.ptr; $P_0, P_1, \ldots, P_{xi-1}$ indicate the data packets whose data is being decoded; m indicates the $m^{th}$ word of the encoded data in each of the specified data packets, and E is an $x_i$ by $x_i$ matrix. Note that all the arithmetic operations in the above references matrix multiplication are over a finite field of size $2^s$, where s is the length of a word.

The E matrix is defined as follows:

$$E = \begin{bmatrix} 1 & 1 & \ldots & 1 \\ PID_0 & PID_1 & \ldots & PID_{x_i-1} \\ (PID_0)^2 & (PID_1)^2 & \ldots & (PID_{x_i-1})^2 \\ \ldots & \ldots & \ldots & \ldots \\ (PID_0)^{x_i-1} & (PID_1)^{x_i-1} & \ldots & (PID_{x_i-1})^{x_i-1} \end{bmatrix}^{-1}$$

where $PID_0, PID_1, \ldots, PID_{x_i-1}$ are the packet identifier values 174 in the data packets whose data is being decoded. The exact composition of matrix E depends on which data packets are successfully received, which is entirely unpredictable, and the PID packet identifiers (which will all be integers between 0 and t) in the above representation of matrix E identify the specific data packets being used by the receiving station to decode the current data block of the message. For example, if $x_i$ is equal to ten for a particular data block, then the receiving station will typically use the first ten successfully received data packets to decode each set of ten words in the data block.

As indicated above, the matrix E is the inverse of the matrix that would be used to generate the $m^{th}$ words of the data packets from the corresponding words of the original message.

The above computation is repeated until all the words in the current data block, plus "OverRun" words of the next data block (if any), are decoded. Then the encoded data for the next data block, if any, is processed.

Finally, at step 234, the data blocks are reordered back to their original order, if the data blocks were transmitted in a different order than in the original message.

An alternative procedure for encoding a message, using the data packet format shown in FIG. 7, is as follows. First, the total size of the encoded message and the number of data packets t to be used are determined in the same manner as discussed above with reference to FIG. 8.

Then, for each separate "unit" of data (i.e., message block) having a distinct redundancy level, the clear text message is stored in uncoded format in the first R data packets, where R differs for each data unit in accordance with the fraction of data packets needed to store the redundancy data. Generally, the high redundancy level units will have more redundancy data, and thus R will be smaller for the higher redundancy units of the message than the lower redundancy units of the message (as is shown in FIG. 7 for two message units). The uncoded (clear text) message is stored in the first R data packets in "striped" format, so that the loss of any one of the first R data packets results in the loss of approximately only one $R^{th}$ of the data in each data block (noting, once again that R is different for each unit of the message).

Next, erasure resilient codes are applied to the data to compute the redundant data corresponding to each of the data blocks. The amount of redundant data computed for each data block depends on the block's length and fractional priority. For instance, if the erasure resilient codes used are Hamming codes or Reed-Solomon codes, the conventional procedures for computing those codes for a specified level of redundancy are used. The resulting redundancy data is then stored in the remaining t-R data packets in "striped" format so that loss of any of those packets results in a limited loss of the redundancy data.

Alternately, the clear text (uncoded) data could be stored in striped format over all t of the data packets, followed by storage of the redundancy data in striped format elsewhere in the n data packets.

At the receiving subscriber stations, if all packets are received without error, the message is recovered simply by reading the clear text data in the data packets. Thus, in low noise data transmission environments, this methodology significantly reduces the computational burden on the receiving subscriber stations.

If one or more data packets for a message are not received or are invalid, data recovery is performed on a data block by data block basis, using the conventional decoding procedures associated with the particular erasure resilient code used. If the amount of valid received data is insufficient to recover any particular data block, attempts to recover that data block are aborted.

Preferred Erasure Resilient Code and Method

Implementation of the present invention can be made more efficient by using more computationally efficient erasure resilient codes, including using erasure resilient codes that include the message in clear text form. The following is a description of an erasure resilient code that is computationally efficient to generate and decode. This erasure resilient code is herein called an "XOR based code".

The XOR based code and the procedure for generating and decode the XOR based code will next be described by showing how the XOR based code would be used to encode a message block having 800 words of data with 28% redundancy using 128 data packets to transmit the message.

Encoding Procedure

Step E1. Compute W, the length of numbers in exponent form in the finite field to be used for encoding the entire message. The size of the finite field is defined as $2^W$ where $$W = 1 + \lceil \log_2(\text{number of data packets}) \rceil$$

In this example, W is equal to 8 because $\log_2(128)$ is equal to 7.

After computing the field length W of numbers in exponent form, the 800 words, denoted $A_1$ to $A_{800}$, are written, W (i.e., eight) words per packet, into the first 100 data packets. These data packets are assigned indices j=0 to 99. The next twenty eight data packets are assigned indices i=0 to 27. More generally, the number of clear text packets, with respect to a particular message block, is denoted as C, and the number of redundant data packets is denoted as R. In the example noted above, C=100 and R=28.

Step E2. An "FFE" (finite field in exponent form) encoding matrix is generated, as follows. The size of the encoding matrix is based on the size of the finite field needed to represent all the data packet indices. The size of the finite field is defined as $2^W$ where $$W = 1 + \lceil \log_2(\text{number of data packets}) \rceil$$

In this example, W is equal to 8 because $\log_2(128)$ is equal to 7. Writing each of the i and j index values as a W-bit number, the next step of the procedure for generating the FFE encoding matrix is to add i, j and $2^{W-1}$ in the XOR based finite field (where addition in this field is performed by exclusive ORing the values to be added), and then to compute the inverse of that value:

t=(i XOR j) XOR 10000000 y'=inverse of t in exponent form

The inverse of t in exponential form is computed, as follows. It is well known that any two non-zero numbers (e.g., two numbers we will call A and B) can be multiplied by computing the log values of the two numbers, adding the two log values, and then computing the inverse log of the summed log values:

$$z = \log_x A + \log_x B$$

$$A \cdot B = x^z$$

where x is the base (such as 2) used for the logarithm function. Using this same technique, two non-zero numbers can be divided by subtracting one number's log from the other, and then computing the inverse log of the result. Thus, the inverse of a value A is computed as follows:

$$\begin{aligned} z &= \log_x 1 - \log_x A \\ &= 0 - \log_x A \\ \text{inverse}(A) &= x^{-\log_x A} \end{aligned}$$

If one uses solely the exponent representations of the values being used, the inverse of a number in exponent form is the negative of the value being inverted.

Similarly, in the finite field used by the XOR based code, one can use discrete logarithms and inverse discrete logarithms to multiply or divide any two numbers within the field. The base for the discrete logarithm is called the primitive element. The primitive element in the preferred embodiment of the present invention is called the "Polymask." Examples of the Polymask value for different finite field sizes are shown in Appendix 1.

To perform multiplication and division operations within the finite field, the encoding procedure computes discrete log and inverse discrete log tables for the finite field, or uses predefined discrete log and inverse discrete log tables if such are available. In the preferred embodiment, the discrete log table is called the "FEtoEXP" table (for "field to exponent" table) and the inverse discrete log table is called the "EXPtoFE" table (for "exponent to field" table). The procedure for generating the discrete log and inverse discrete log tables for an XOR based finite field of size $2^W$ is shown in Appendix 1. For the purposes of the following discussion, it will be assumed that such tables are available for use by the encoding and decoding procedures for the XOR based code.

Returning to the task of computing y', the steps are as follows:

y=FEtoEXP(t)

y'=$(2^W-1-y)$ mod $2^W-1$ where y' is in exponent form.

The FFE encoding matrix $[e_{i,j}]$ is a R×C matrix, $$\begin{bmatrix} e_{0,0} & \ldots & e_{0,C-1} \\ \ldots & \ldots & \ldots \\ e_{R-1,0} & \ldots & e_{R-1,C-1} \end{bmatrix}$$

where each element $e_{i,j}$ is defined as $e_{i,j}=(2^W-1-\text{FEtoEXP}(i\ \text{XOR}\ j\ \text{XOR}\ 2^W-1)) \mod 2^W 31\ 1$ where $e_{i,j}$ is the exponent representation of the i,j matrix element.

Step E3. The third step of the encoding procedure is to convert the FFE encoding matrix into a binary encoding matrix. Each of $e_{i,j}$ elements of the FFE encoding matrix is expanded into a W by W (8 by 8 in this example) matrix of binary (i.e., 0/1 values). The W×W matrix for any one $e_{i,j}$ encoding matrix element corresponds to the computational relationship between W clear text words in one of the clear text data packets and eight encoded words in one of the redundant data packets, and is formed as follows:

1st column = the individual bits of the value EXPtoFE($e_{i,j}$)

2nd column = the individual bits of the value EXPtoFE($e_{i,j}$ + 1)

3nd column = the individual bits of the value EXPtoFE($e_{i,j}$ + 2)

. . .

Wth column = the individual bits of the value EXPtoFE($e_{i,j}$ + W − 1)

The full encoding matrix for an 800 word message block to be stored in 128 data packets in an array of 28 by 100 of such 8 by 8 matrices, for a total size of 224 rows by 800 columns.

Binary Encoding Matrix =

$$\begin{bmatrix} [\text{matrix for } i=0, j=0] & \ldots & [\text{matrix for } i=0, j=99] \\ \ldots & \ldots & \ldots \\ [\text{matrix for } i=27, j=0] & \ldots & [\text{matrix for } i=27, j=99] \end{bmatrix}$$

Step E4. The encoded redundant data $P_1$ to $P_{224}$ representing the encoded portion of the erasure resilient code for each of the i=1 to 28 redundant data packets is generated by multiplying the corresponding eight rows of the encoding matrix by the 800 words of message data:

$$\begin{bmatrix} P_1 \\ P_2 \\ \cdot \\ \cdot \\ \cdot \\ P_{224} \end{bmatrix} = \begin{bmatrix} \text{BINARY} \\ \text{ENCODING} \\ \text{MATRIX} \end{bmatrix} \begin{bmatrix} A_1 \\ A_2 \\ \cdot \\ \cdot \\ \cdot \\ A_{800} \end{bmatrix}$$

Note that all mathematical operations in the preferred encoding and decoding procedures, including the above matrix multiplication, are performed within the selected finite field. In the finite field used herein, the dot product of two vectors is computed by multiplying each of the corresponding vector elements, and then successively XORing the resulting values to produce a single value within the finite field. Each of the encoded redundant data values $P_i$ values is equal to the dot product of the $i^{th}$ row of the binary encoding matrix and the vector representing the message data.

The encoded data $P_1$ to $P_{224}$ can be generated in smaller increments by multiplying the W by W matrix for one submatrix of the encoding matrix (for one pair of i, j values) by the corresponding set of W words of the message block, and then XORing each of the resulting W words by the corresponding previous values of the i'th redundant data packet.

Step E5. Store the encoded redundancy data $P_1$ to $P_{224}$, eight words per packet, in each of the last 28 data packets.

Steps X1 to X5 are repeated for all message blocks, each with its own specified redundancy or priority level. Thus, a 640 word message block with a specified 60% redundancy level would be stored 8 words in each of the first 80 data packets, and XOR based codes generated using the procedure of steps X1 to X3 would be stored in the remaining 48 data packets.

Add CRCs to data packets. This step may be performed by the network level software, rather than the application level software.

Decoding Procedure

Step D1. A receiving device, under the control of the device's network communications software, receives the transmitted data packets. It then checks each packet's CRC, throwing out packets with bad CRC values. The receiving device, under the control of the network communications software then passes all the good received data packets to an application program for further processing.

Step D2. The application program using the present invention stores the successfully received data packets in their proper position in an array in memory or a file.

The application program, using the block size and redundancy level information stored in the received packets determines the block sizes and redundancy levels for each block within the message represented by the received data packets from the associated information stored in the received data packets.

The following steps are the steps for decoding one data block within the message. The decoding procedure will be explained by using an example. In particular, we will assume that the first data block to be decoded is the same as the one encoded in the above example: a data block of 800 words, stored in the first 100 transmitted data packets in clear text strings of 8 words followed by 28 data packets containing strings of 8 words of encoded data. Furthermore, we will assume that 5 of the first 100 data packets were lost or corrupted during transmission, and that the first 5 of the remaining 28 "redundant data" data packets were received in good condition and that those redundant data packets will be used to regenerate the message portion in the missing clear text data packets.

More generally, M of the C clear text packets will be missing, and thus M redundant data packets (if present) will be used in their place. If the number of successfully received redundant data packets is less than M, the decoding procedure is aborted and the corresponding message block is lost because insufficient data has been received to regenerate that message block.

Step D3. Based on the division of data packets into clear text and redundant data packets, which can be different for different message blocks, the decoding procedure stores the indices of the successfully received redundant data blocks in a vector as $X_1, X_2, X_3, \ldots, X_M$. Similarly, the indices of the missing clear text packets are stored in another vector as $Y_1, Y_2, Y_3, \ldots, Y_M$. Since the division of data packets between clear text packets and redundant data packets can be different for each data block, this step of identifying the missing clear text packets and an equal number of redundant data packets must be repeated for each message block having a different redundancy level than the previous message block to be processed.

Step D4. Next, the decoding procedure generates a new "partial encoding" matrix X representing a subset of the rows of the full encoding matrix for the data block (as described above in step E2) corresponding to the redundant data packets $(X_1, X_2, X_3, \ldots, X_M)$ to be used and to the missing clear text packets $(Y_1, Y_2, Y_3, \ldots, Y_M)$. More specifically, the partial encoding matrix is the submatrix of the FFE encoding consisting of the M rows of the FFE encoding matrix indexed by $X_1, X_2, X_3, \ldots, X_M$, but excluding the M columns indexed by $Y_1, Y_2, Y_3, \ldots, Y_M$.

In our example, where the redundant indices vector $X_1, X_2, X_3, \ldots, X_M$, equals $1, 2, \ldots, 5$, and the missing indices vector $Y_1, Y_2, Y_3, \ldots, Y_M$ equals $1, 2, \ldots, 5$, the partial encoding FFE matrix (in exponent form) has the form:

$$\begin{bmatrix} e_{0,5} & \ldots & e_{0,99} \\ e_{1,5} & \ldots & e_{1,99} \\ \ldots & \ldots & \ldots \\ e_{4,5} & \ldots & e_{4,99} \end{bmatrix}$$

Step D5. The partial encoding FFE matrix is next converted into a binary encoding matrix by converting of each the $e_{i,j}$ elements in the partial encoding FFE array into a column of W binary bit values:

1st column = the individual bits of the value EXPtoFE($e_{i,j}$)

2nd column = the individual bits of the value EXPtoFE($e_{i,j}$ + 1)

3nd column = the individual bits of the value EXPtoFE($e_{i,j}$ + 2)

...

Wth column = the individual bits of the value EXPtoFE($e_{i,j}$ + W − 1)

The resulting partial encoding binary matrix has M×W rows and (C-M)×W columns. In our example, the partial encoding binary encoding matrix has (i.e., 5×8) rows and 760 (i.e., (100-5)×8) columns, and thus has the form:

Partial Binary Encoding Matrix =

$$\begin{bmatrix} [\text{matrix for } i=0, j=5] & \ldots & [\text{matrix for } i=0, j=99] \\ \ldots & \ldots & \ldots \\ [\text{matrix for } i=4, j=5] & \ldots & [\text{matrix for } i=4, j=99] \end{bmatrix}$$

Step D6. Let $B_1, \ldots, B_{(C-M) \times W}$ ($B_1, \ldots, B_{760}$ in our example) be the clear text words received, in the same order as found in the properly ordered clear text data packets. Let $R_1, \ldots, R_{M \times W}$ ($R_1, \ldots, R_{40}$ in our example) be a first set of intermediate data values, to be computed as follows:

$$\begin{bmatrix} R_1 \\ R_2 \\ \cdot \\ \cdot \\ \cdot \\ R_{40} \end{bmatrix} = \begin{bmatrix} \text{Partial} \\ \text{BINARY} \\ \text{ENCODING} \\ \text{MATRIX} \end{bmatrix} \begin{bmatrix} B_1 \\ B_2 \\ \cdot \\ \cdot \\ \cdot \\ B_{760} \end{bmatrix}$$

Step D7. Next, let $P_1, \ldots, P_{M \times W}$ ($P_1, \ldots, P_{40}$ in our example) be the encoded redundant data in the selected redundant data packets in the same order as found in the properly ordered redundant data packets, and let $Z_1, \ldots, Z_{M \times W}$ ($Z_1, \ldots, Z_{40}$ in our example) be a set of second intermediate data values, to be computed as follows:

$$\begin{bmatrix} Z_1 \\ Z_2 \\ \cdot \\ \cdot \\ \cdot \\ Z_{40} \end{bmatrix} = \begin{bmatrix} R_1 & XOR & P_1 \\ R_2 & XOR & P_2 \\ & \cdot & \\ & \cdot & \\ & \cdot & \\ R_{40} & XOR & P_{40} \end{bmatrix}$$

Step D8. Next, form an M×M (i.e., 5×5) matrix which is the inverse of a selected submatrix of the encoding FFE matrix. The selected submatrix of the encoding FFE matrix consists of the M rows corresponding the redundant data packets $(X_1, X_2, X_3, \ldots X_M)$ to be used and the M columns of those rows corresponding to the missing clear text packets $(Y_1, Y_2, Y_3, \ldots, Y_M)$.

In our example, where the redundant indices vector $X_1$, $X_2, X_3, \ldots X_M$, equals 1, 2, . . . 5, and the missing indices vector $Y_1, Y_2, Y_3, \ldots Y_M$ equals 1, 2, . . . , 5, the M×M partial FFE matrix (in exponent form) for this step of the decoding procedure has the form:

$$\begin{bmatrix} e_{0,0} & \ldots & e_{0,4} \\ e_{1,0} & \ldots & e_{1,4} \\ \ldots & \ldots & \ldots \\ e_{4,0} & \ldots & e_{4,4} \end{bmatrix}$$

It can be proven analytically that the resulting matrix (a 5×5 matrix in our example) is a Cauchy matrix, and thus is an invertible matrix.

Step D8. The next step of the decoding procedure is to invert the partial encoding matrix. The procedure for inverting the partial encoding matrix is shown in Appendix 2.

Step D9. The decoding procedure next converts the inverted partial encoding matrix into an inverse binary matrix using the same conversion procedure as in steps E2 and D5 above. This converts the M×M (i.e., 5×5) inverted FFE matrix into a M·W×M·W (i.e., 40×40) binary matrix.

Step D10. Finally, the decoding procedure recovers the data in the lost data packets $(A_1 \ldots, A_{40}$ in our example) by multiplying the inverted binary matrix by the second set of intermediate data values (where the addition operation in the defined field is performed by XORing the data to be added):

$$\begin{bmatrix} A_1 \\ A_2 \\ \cdot \\ \cdot \\ \cdot \\ A_{40} \end{bmatrix} = \begin{bmatrix} \text{Inverted} \\ \text{Partial} \\ \text{Binary} \\ \text{Matrix} \end{bmatrix} \begin{bmatrix} Z_1 \\ Z_2 \\ \cdot \\ \cdot \\ \cdot \\ Z_{40} \end{bmatrix}$$

The recovered clear text words $A_1 \ldots, A_{40}$ are then inserted in the received data array or buffer in their proper order.

An advantage of the XOR code described above is that the efficiency of the encoding and decoding procedures increases as the word length of the data processed by the CPUs running the encoding and decoding procedures increases. The reason for this is that all the XOR operations are performed in parallel on all the bits of each word, and thus increasing the word length processed by the CPUs reduces the number of computation instructions to be executed to process a given message.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX 1

PROCEDURE FOR SETTING UP EXPtoFE and FEtoEXP TABLES FOR FINITE FIELD

Inputs to Procedure:
  W = Field Length, e.g., 8
  Polymask(W):

POLYMASK (W) Values (In HEX) for W = 1 to 15

| W | Polymask | W | Polymask | W | Polymask |
|---|----------|---|----------|---|----------|
| 1 | 3        | 6 | 43       | 11 | 805     |
| 2 | 7        | 7 | 83       | 12 | 1053    |
| 3 | B        | 8 | 11D      | 13 | 201B    |
| 4 | 13       | 9 | 211      | 14 | 402B    |
| 5 | 25       | 10| 409      | 15 | 8003    |

```
Procedure:
SIZEM = 2^W – 1       /* Size of Multiplicative Group of Field */
CARRYMASK = 2^W
EXPtoFE(0) = 1
For i = 1 to SIZEM+W–2
    {
    EXPtoFE(i) = 2·EXPtoFE(i–1)
    If EXPtoFE(i) ≧ CARRYMASK
        {
        EXPtoFE(i) = POLYMASK(W) XOR EXPtoFE(i)
        }
    }
For i = 0 to SIZEM–1
    {
    FEtoEXP( EXPtoFE(i) ) = i
    }
Return
```

APPENDIX 2

PROCEDURE FOR INVERTING FFE MATRIX

Inputs: W, $X_1$ to $X_M$, $Y_1$ to $Y_M$
  where
    W = Field Length, e.g., 8
    $Y_1$ to $Y_M$ are the packet indices of the M missing clear text packets
    $X_1$ to $X_M$ are the packet indices of M received redundant packets
Outputs: $[d_{i,j}]$ is the inverted M × M matrix of finite field exponents
Procedure:
/* all numeric values are represented using W bits */
For k = 1 to M

APPENDIX 2-continued

PROCEDURE FOR INVERTING FFE MATRIX

```
{
a_k = b_k = e_k = f_k = 0
For i = 1 to M
    {
    e_k = (e_k + FEtoEXP(X_k XOR Y_i XOR 2^{W-1}) mod 2^W - 1
    f_k = (f_k + FEtoEXP(Y_k XOR X_i XOR 2^{W-1}) mod 2^W - 1
    If i ≠ k
        {
        a_k = (a_k + FEtoEXP(X_k XOR X_i XOR 2^{W-1}) mod 2^W - 1
        b_k = (b_k + FEtoEXP(Y_k XOR Y_i XOR 2^{W-1}) mod 2^W - 1
        }
    }
}
For i = 1 to M
    {
    For j = 1 to M
        d_{i,j} = (e_j + f_i - a_j - b_i - FEtoEXP(X_j XOR Y_i XOR 2^{W-1})) mod 2^W - 1
    }
Return
```

What is claimed is:

1. A data distribution system, comprising:

a multiplicity of data processing devices interconnected by data transmission media;

one of said data processing devices including:

memory for storing a message to be transmitted as a stream of data packets to at least one other of said data processing devices;

priority data, stored in said memory, representing a plurality of assigned priority levels $p_i$ for specified portions of said stored message such that all portions of said stored message have respective assigned priority levels; each priority level $p_i$ indicating that the message portions to which each respective priority level $p_i$ is assigned are to be recoverable whenever at least a $p_i$ fraction of the transmitted data packets are received by a data receiving device;

programmable data processing circuitry;

a data encoding program, executed by said programmable data processing circuitry, for generating an encoded representation of said stored message that includes, for each said portion of said stored message, a level of redundant data $L_i$ corresponding to the priority level $p_i$ assigned to said portion of said stored message, such that said encoded representation of said stored message includes a plurality of different non-zero levels of redundant data for said different portions of said stored message;

a data packetizing program that distributes and stores said encoded representation of said stored message in a plurality of data packets such that, for each defined priority level $p_i$, every possible subset of said data packets having more than said $p_i$ fraction of said data packets includes sufficient information to reconstruct the portions of said stored message to which said priority level $p_i$ is assigned; and data transmission apparatus for transmitting said encoded representation of said stored message as a sequence of said data packets representing a single logical message to said at least one other of said data processing devices;

said at least one other of said data processing devices including:

data receiving apparatus for receiving at least a subset of said transmitted data packets;

memory for at least temporarily storing said received data packets;

programmable data processing apparatus; and a data decoding program, executed by said programmable data processing apparatus, for generating a decoded representation of said received data packets, including decoding different portions of said received data packets in accordance with the different levels of redundant data included in said encoded representation of said stored message.

2. The data distribution system of claim 1, said data encoding program including a program portion for embedding data representing said priority data in said encoded representation of said stored message; and said data decoding program including a program portion for recovering said priority data from said received data stream and for storing said recovered priority data in said memory of said at least one other of said data processing devices.

3. The data distribution system of claim 1, said data encoding program including a program portion for reordering portions of said encoded representation of said stored message in accordance with said priority data.

4. The data distribution system of claim 3, further including:

a data filter that receives said encoded data steam prior to receipt thereof by a second one of said data processing devices, removes portions of said received encoded data stream corresponding to said portions of said stored message assigned lowest ones of said priority levels so as to generate a reduced bandwidth data stream, and then transmits said reduced bandwidth data stream to said second one of said data processing devices.

5. The data distribution system of claim 1, further including:

a data filter that receives said encoded data steam prior to receipt thereof by a second one of said data processing devices, removes portions of said received encoded data stream corresponding to said portions of said stored message assigned lowest ones of said priority levels so as to generate a reduced bandwidth data stream, and then transmits said reduced bandwidth data stream to said second one of said data processing devices.

6. The data distribution system of claim 1, wherein said encoded representation of said stored message generated by said encoding program includes (A) clear text data comprising said stored message in uncoded form, and (B) encoded redundant data; and said data decoding program includes a program portion for utilizing said clear text data in said received encoded data stream as said decoded representation of said received data stream and for decoding said encoded redundant data to generate any portions of said clear text data in said transmitted data stream not received by said at least one other of said data processing devices.

7. The data distribution system of claim 1, wherein said one data processing device includes network control software, executed by said programmable data processing circuitry, for controlling transmission of said encoded data stream as a sequence of data packets, and an application program, executed by said programmable data processing circuitry, that calls said data encoding program to encode said stored message, and that passes said encoded representation of said stored message to said network control software for transmission as said sequence of data packets.

8. The data distribution system of claim 7, wherein said at least one other of said data processing devices includes:

network control software, executed by said programmable data processing apparatus, for controlling receipt of said sequence of data packets and for discarding ones of said data packets in said sequence of data packets that do not meet predefined validity criteria; and application software, executed by said programmable data processing apparatus, that calls said data decoding program to decode those of said received sequence of data packets not discarded by said network control software.

9. A method of operating a data distribution system, comprising the steps of:

in a first data processing device:
storing a message to be transmitted as a stream of data packets to at least one other of said data processing devices;

storing priority data representing a plurality of assigned priority levels $p_i$ for specified portions of said stored message such that all portions of said stored message have respective assigned priority levels; each priority level $p_i$ indicating that the message portions to which each respective priority level $p_i$ is assigned are to be recoverable whenever at least a $p_i$ fraction of the transmitted data packets are received by a data receiving device;

executing a data encoding program to generate an encoded representation of said stored message that includes, for each said portion of said stored message, a level of redundant data corresponding to the priority level assigned to said portion of said stored message, such that said encoded representation of said stored message includes a plurality of different levels of redundant data for said different portions of said stored message;

distributing and storing said encoded representation of said stored message in a plurality of data packets such that, for each defined priority level $p_i$, every possible subset of said data packets having more than said $p_i$ fraction of said data packets includes sufficient information to reconstruct the portions of said stored message to which said priority level $p_i$ is assigned; and transmitting said encoded representation of said stored message as a sequence of said data packets representing a single logical message to at least one other data processing device; and in said at least one other data processing device:
receiving at least a subset of said sequence of data packets;

at least temporarily storing said received data packets; and executing a data decoding program to generate a decoded representation of said received data packets, including decoding different portions of said received data packets in accordance with the different levels of redundant data included in said stored message.

10. The method of claim 9, further including:

in said first data processor, embedding data representing said priority data in said encoded representation of said stored message; and in said at least one other data processing device, recovering said priority data from said received data packets and storing said recovered priority data in said at least one other of said data processing devices.

11. The method of claim 9, in said first data processor, reordering portions of said encoded representation of said stored message in accordance with said priority data.

12. The method of claim 9, further including:

prior to receipt of said encoded data steam by at least a subset of said other data processing devices, removing portions of said transmitted sequence of data packets corresponding to said portions of said stored message assigned lowest ones of said priority levels so as to generate a reduced bandwidth data stream, and then transmitting said reduced bandwidth data stream to said subset of said other data processing devices.

13. The method of claim 9, further including:

prior to receipt of said encoded data steam by at least a subset of said other data processing devices, removing portions of said received sequence of data packets corresponding to said portions of said stored message assigned lowest ones of said priority levels so as to generate a reduced bandwidth data stream, and then transmitting said reduced bandwidth data stream to said subset of said other data data processing devices.

14. The method of claim 9, wherein said encoded representation of said stored message generated by said encoding step includes (A) clear text data comprising said stored message in uncoded form, and (B) encoded redundant data; and said data decoding program includes a program portion for utilizing said clear text data in said received sequence of data packets as said decoded representation of said received data stream and for decoding said encoded redundant data to generate any portions of said clear text data in said transmitted data stream not received by said at least one other of said data processing devices.

15. The method of claim 9, including:

in said first data processing device, executing network control software for controlling transmission of said sequence of data packets as a sequence of data packets, and executing an application program that calls said data encoding program to encode said stored message and that passes said encoded representation of said stored message to said network control software for transmission as said sequence of data packets.

16. The method of claim 15, including, in said at least one other of said data processing devices:

executing network control software to control receipt of said sequence of data packets and to discard ones of said data packets in said sequence of data packets that do not meet predefined validity criteria; and executing application software that calls said data decoding program to decode those of said received sequence of data packets not discarded by said network control software.

17. A method of encoding and transmitting data, comprising the steps of:

in a first data processing device:

storing a message and priority data representing a plurality of assigned priority levels $p_i$ for specified portions of said message such that all portions of said message have respective assigned priority levels;

encoding said message so as to generate an encoded representation of said message that includes, for each said portion of said message, a level of redundant data corresponding to the priority level assigned to said portion of said message, such that said encoded representation of said message includes a plurality of different levels of redundant data for said different portions of said message;

distributing and storing said encoded representation of said message in a plurality of packets such that, for each defined priority level $p_i$, every possible subset of said packets having more than a corresponding fraction of said packets includes sufficient information to reconstruct the portions of said message to which said priority level $p_i$ is assigned; and transmitting said plurality of packets having said encoded representation of said message to at least one other data processing device.

18. The method of claim 17, further including:

in said first data processor embedding data representing said priority data in said encoded representation of said stored message; and ordering, in said packets, portions of said encoded representation of said stored message in accordance with said priority data.

19. The method of claim 18, further including:

prior to receipt of said packets by at least a subset of said other data processing devices, removing portions of said packets corresponding to said portions of said stored message assigned lowest or highest ones of said priority levels so as to generate a reduced bandwidth data stream, and then transmitting said reduced bandwidth data stream to said subset of said other data processing devices.

* * * * *